Oct. 13, 1942.  C. S. JOHNSON  2,298,566
ROTARY SCOOP TYPE MACHINE FOR HANDLING BULK MATERIALS
Filed Sept. 14, 1940  2 Sheets-Sheet 1
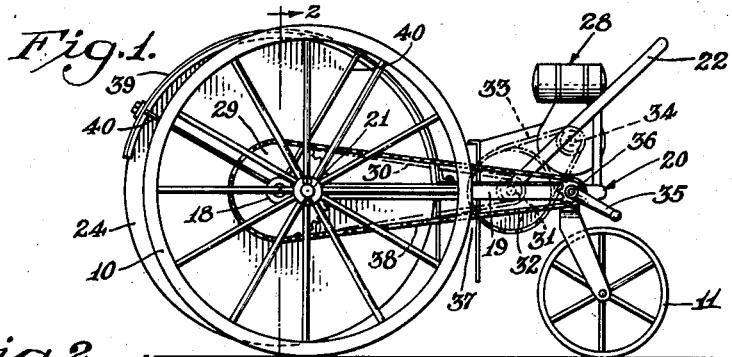
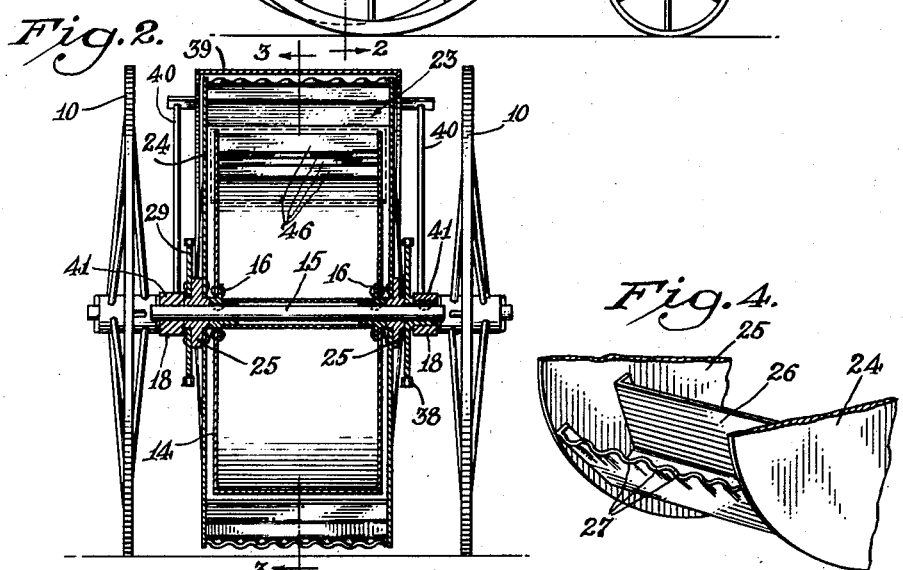
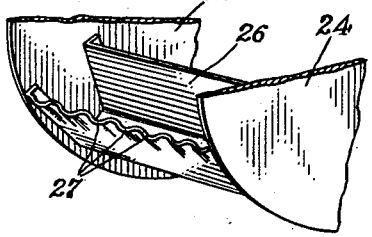
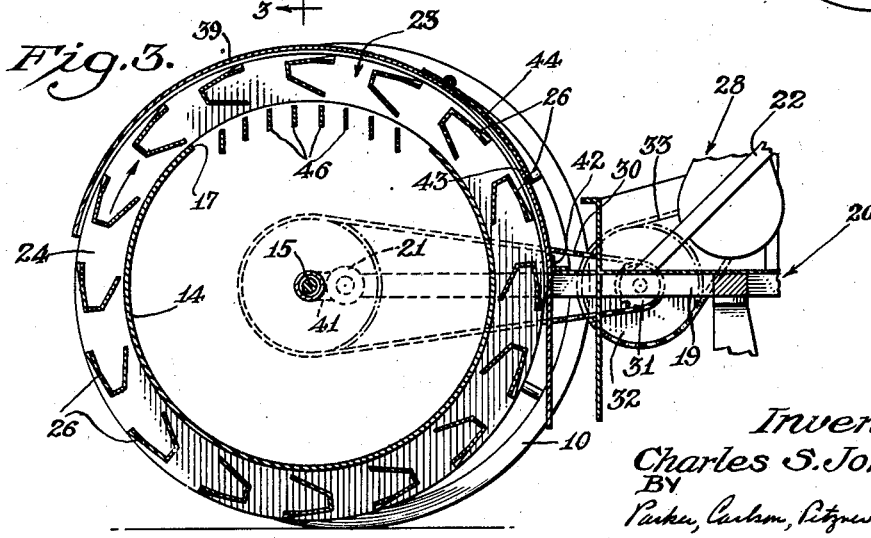
Inventor
Charles S. Johnson
BY
Parker, Carlson, Pitzner & Hubbard
Attorneys.

Oct. 13, 1942.  C. S. JOHNSON  2,298,566
ROTARY SCOOP TYPE MACHINE FOR HANDLING BULK MATERIALS
Filed Sept. 14, 1940  2 Sheets-Sheet 2

Inventor
Charles S. Johnson
By
Parker, Carlson, Pitzner & Hubbard
Attorneys.

Patented Oct. 13, 1942

2,298,566

UNITED STATES PATENT OFFICE 2,298,566

ROTARY SCOOP TYPE MACHINE FOR HANDLING BULK MATERIALS

Charles S. Johnson, Champaign, Ill., assignor to The C. S. Johnson Company, Champaign, Ill., a corporation of Illinois Application September 14, 1940, Serial No. 356,744

8 Claims. (Cl. 214—78)

The invention relates to a novel rotary scoop type machine for handling loose bulk materials. Machines embodying the present invention find particular utility in extracting bulk dry cement from storage piles, as for example, in unloading such material from a box car. Though the presently described machine has been designed to meet the exigencies of handling bulk cement, it can, if desired, be used for handling many other bulk materials such as seed grain.

Dry cement is commonly shipped in loose bulk form in box cars, and considerable delay and expense have heretofore been entailed in unloading it. The common practice has been to provide a small, wheeled cart into which a workman shovels the cement. The cart is then wheeled out of the car, its contents dumped into a receiving hopper and the cart returned for reloading. Simply a recitation of the process makes clear its almost painful slowness. What is not so obvious, however, are the difficulties incident to such handling of dry bulk cement arising from the nature of the material itself. Being a very finely divided, powdery material, it has an extreme tendency to dust and aerate. As to dusting, when the material is disturbed by shoveling, it rises in clouds of dust, choking the workmen and covering everything in the vicinity with a film of dust. As to aeration, it should be borne in mind that the fluffy aerated cement slides easily off a shovel so that only a very limited quantity can be handled per scoop, thereby retarding what is at best a slow process. Of course these same difficulties arise whenever bulk cement is being shifted by a hand shovel process, whether when unloading it from a box car or under some other circumstances.

Generally stated it is an object of the present invention to provide a rotary scoop type of apparatus for digging out a quantity of bulk cement or like loose bulk material from a pile and transporting it, while obviating the difficulties incident to dusting and aeration referred to above.

Another object is to provide a rotary type scoop machine for the purpose indicated whose loading mechanism is power driven and which can be easily wheeled about from place to place where its use is required.

Another object is to provide such a rotary type machine with a power drive therefor and which is of such character that when the container of the machine is loaded the machine can be shifted to a place of discharge for the container, and its load dumped, without having to shut off or disable the power drive of the loading mechanism. This is a particularly desirable feature in that it makes it possible for an ordinary unskilled laborer, having no knowledge of manipulation of the drive mechanism, to operate the machine satisfactorily. The engineer or skilled supervisor on the job can start the drive mechanism and after that the laborer merely lets it run without having to stop it or declutch it at any time during the normal use of the machine.

Another object is to provide a machine of the class indicated embodying a loading mechanism in the form of a rotary scoop, and in which the elements of the machine are so arranged that after the machine's container is full, any additional material fed to it by the loading mechanism will merely be carried away in a harmless overrun. This again is a feature which particularly adapts the machine for use by an unskilled laborer since it effectually prevents damage to the machine that might otherwise result from inadvertent overloading.

Still another object is to provide a machine of the character indicated embodying a novel and highly effective dust shielding arrangement, thereby particularly adapting it for use in handling dry cement.

The invention also resides in various structural improvements and correlated arrangements of the parts of the machine by means of which simplicity and low cost of construction are combined with extreme ruggedness and efficiency of operation.

Further objects and advantages of the invention will become apparent as the following description proceeds taken in connection with the accompanying drawings in which:

Figure 1 is a side elevation of a rotary scoop type bulk material handling machine, embodying my invention.

Fig. 2 is an enlarged end elevation of the machine of Fig. 1, with a portion of the machine sectioned substantially along the line 2—2 in Fig. 1.

Fig. 3 is a partial longitudinal sectional view of the machine taken substantially along the line 3—3 in Fig. 2.

Fig. 4 is a fragmentary detail perspective view of one of the digger scoops of the rotary scoop assembly.

Figure 5:
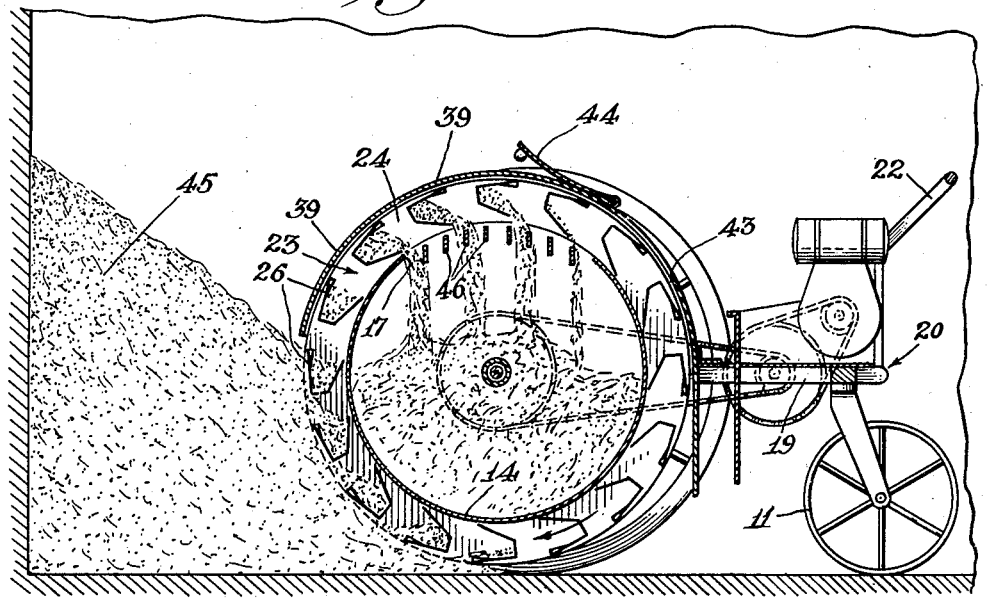
Figs. 5 and 6 are side elevations of the machine, with its forward portion longitudinally sectioned as in Fig. 3, showing the machine respectively during its loading and unloading operations.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

In the illustrative embodiment of the invention the machine has been shown (Figs. 1 and 2) as mounted on a pair of cart wheels 10 and a rear caster wheel 11 so that it can be moved about with great facility even in confined spaces. In use it is wheeled up to a pile of material (see Fig. 5) into which it eats its way, filling a container included in the machine. When full, the machine is wheeled over to a discharge hopper 12 (see Fig. 6) and into which the container is dumped. The digging or loading apparatus of the machine is power driven so that the loading of the machine is much faster and less laborious than the hand shoveling of a load into a cart and, as will appear more particularly below, the whole operation is carried out with much less dusting and difficulty with aeration of such materials as dry cement than is possible when shoveling the material by hand.

Referring more particularly to the instant machine, it comprises a load-container in the form of a cylindrical steel drum 14 (Figs. 2 and 3) coaxial with a horizontal trunnion shaft 15. This latter shaft passes through hubs 16 bolted to the end walls of the drum 14 and keyed to the trunnion shaft so that the drum turns with the latter. A large peripheral opening 17 is provided in the drum extending over about 60 degrees of the latter's periphery. When the drum 14 is in what may be termed its upright or filling position, shown in Figs. 3 and 5, and in which the opening 17 is at the top of the drum, the opening is positioned for gravity discharge into it of material supplied from the rotary scoop mechanism described hereinafter. Alternatively, when the drum 14 is rotated through 180 degrees to the dumping position shown in Fig. 6 the opening 17 constitutes a discharge opening at the bottom of the drum through which the drum contents is dumped by gravity flow.

The trunnion shaft 15, which carries the drum 14 as described above, is loosely journaled in bearings 18 at the forward ends of longitudinal side members 19 of a suitable cart frame designated generally as 20. The cart wheels 10 are journaled at 21 on the frame members 19 (see Figs. 1 and 3) just to the rear of the trunnion shaft 15, while the caster wheel 11 supports the rear end of the frame. A handle 22, rigid with the frame 20, projects from the rear of the latter in a position convenient to the operator. By virtue of the cart mounting described, the operator can push the vehicle around to any desired position with great ease and he can also tilt the nose or front end of the machine down when necessary, simply by lifting on the handle 22.

Encircling the drum 14, and also carried by the trunnion shaft 15, is a rotary scoop assembly designated generally as 23, which constitutes, in effect, an outer drum in which the inner drum 14 is nested. This assembly comprises a pair of disk-shaped sheet-metal end-plates 24, coaxial with the shaft 15 and loosely journaled on it by hubs 25. A series of digger scoops 26 are arranged in an endless series encircling the drum 14. As best shown in Fig. 4, these scoops are made of sheet metal, being trough-shaped and having flanges at their opposite ends welded to the end plates 24. The outer or digging edges of the scoops 26 are preferably fluted as indicated at 27. Each of the scoops faces in the direction of rotation of the assembly 23, that is, clockwise, as viewed in Fig. 3. It should also be observed that the inner walls of the scoops 26 are slanted inward toward the drum 14 so that as the scoops pass over the top of the drum 14, in registry with the opening 17, the contents of the successive scoops will readily slide by gravity into the drum.

The scoop assembly 23, which is freely revoluble on the trunnion shaft 15, is driven by an actuator herein shown (Figs. 1 and 3) in the form of a small gasoline engine 28 mounted on the frame 20. The engine 28 drives the scoop assembly 23 through a sprocket 29 (see Fig. 2) fixed to the adjacent one of the hubs 25. A chain 30 is trained over this sprocket and over a small sprocket 31 journaled on the cart frame 20. A larger speed reduction sprocket 32 is fast on the sprocket 31 and is, in turn driven by an endless chain 33 trained over a power take off sprocket 34 on the engine.

Also mounted on the cart frame 20 is a hand crank 35 for tilting the drum 14 (Fig. 1). This hand crank is fixed to a small sprocket 36 engaging an endless roller chain 37 trained over a sprocket 38 (see Fig. 2) keyed to the trunnion shaft 15 at the end thereof opposite the scoop-driving sprocket 29. Thus, by revolving the crank 35 the drum 14 can be turned between its loading and unloading positions shown respectively in Figs. 5 and 6.

A dust guard shrouds the top of the rotary scoop assembly 23. This dust guard comprises an arcuate sheet metal plate 39 supported by two pairs of bracket arms 49 (Figs. 1 and 2) projecting upward from blocks 41 journaled on the trunnion shaft 15. The rear portion of the dust guard plate 39 is fixed to a transverse angle iron 42 (Fig. 3) on the cart frame 20. The tail of the guard plate 39 projects down well below the horizontal center line of the rotary scoop assembly. It will be observed that the imperforate sheet metal end plates 24 of the scoop assembly cooperate with the guard plate 39 to substantially totally enclose the revolving series of scoops except for the lower and forward portion of the scoops' path where they bite into the pile of material being loaded (see Fig. 5). Particularly well enclosed is the portion of the path of the rotary scoops 26 at which they dump their contents into the drum 14. In this way substantially all of the dust stirred up by the machine during its operation is confined within the housing comprised of the members 24 and 39. An observation port 43 is provided in the dust guard plate 39 and arranged to be closed by a hinged door 44, so that upon opening this door the operator can observe the amount of material, if any, which is being carried by the scoops 26 past the filling opening 17 in the drum 14.

In the operation of the machine described the engine 28 is started and thereafter runs continuously, it being unnecessary to stop the rotary scoop assembly 23 even when the drum 14, which it encircles, is being emptied. This is particularly advantageous with respect to the class of workmen required as operators. In view of the fact that the engine can and does run continuously the operator need have no skill in manipulating it, as it can be started by the foreman or other skilled supervisor and left running throughout the working day. All the operator himself has to be able to do is to wheel the cart around in moving the machine into working and discharge position and to turn the crank 35 for dumping the load and returning the drum to filling position.

After the engine 28 has been started as noted above, the operator wheels the machine up to a pile of dry cement 45 (Fig. 5) or similar loose bulk material, so that the revolving series of scoops 26 dig their way into the pile. As each loaded scoop passes over the upwardly facing opening 17 in the drum 14 it dumps its contents through this opening into the drum as shown. The opening 17 is long enough, circumferentially of the drum, that the scoops will be fully emptied before they pass out of registry with the opening. The operator pushes the cart forward from time to time as the pile of material 45 is eaten away. Even though a highly aerated, fluffy material is being handled, the rapidly revolving series of scoops quickly load it into the container since with such an arrangement a small amount of material per scoop is a much less serious matter than in hand shoveling. The operator is apprised of completion of filling of the drum 14 by observing the scoops or buckets 26 through the port 43 in the dust guard. The scoops will be empty when they pass by the observation port until the drum is filled. After it is filled, however, material is carried on around the drum periphery by the scoops, being readily visible to the operator, so that he realizes the drum is overrunning and is full. If he should fail to comprehend this fact quickly no harm is done for the overrun is simply carried on around by the scoops. This observation arrangement for determining indirectly when the drum is full is particularly advantageous since the drum or container 14 is located right in the heart of the revolving scoop mechanism and is, therefore, difficult of direct observation.

As to the filling of the drum 14, it should be observed that a plurality of vertical baffle plates or bars 46 (Figs. 3 and 5) are arranged to extend longitudinally of the drum across the opening 17. These baffles are spaced from each other as shown and are of sufficient vertical depth so that each baffle, beginning at the center of the opening, extends well below the upper edge of the next adjacent baffle. Consequently as the level of the cement rises in the drum 14 it cannot flow out between any pair of the baffles without moving down beneath one of the baffles and up over the next adjacent one. In this way substantially complete filling of the drum is insured, thereby increasing its capacity approximately ten to fifteen percent as compared to a drum unequipped with such a baffle arrangement.

Figure 6:
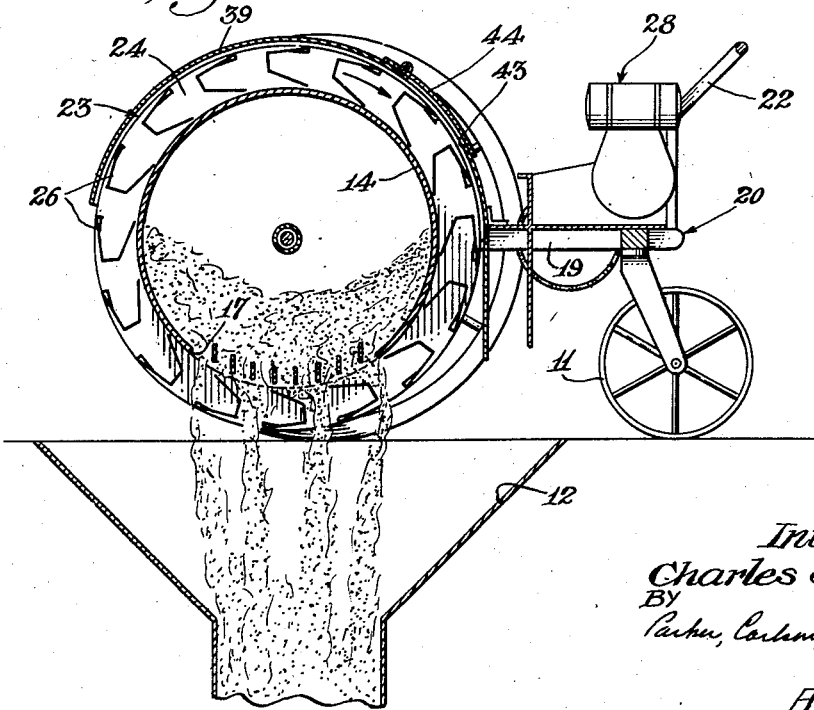

After the drum 14 has been filled as described above, the operator wheels the machine over to a point to which the drum 14 overlies the discharge hopper 12 (Fig. 6). Thereupon he turns the hand crank 35 to revolve the drum 14 through substantially 180 degrees and its contents pours out through the opening 17 into the hopper. As to this dumping operation it will be noted that the scoops 26 are spaced apart so that the overflowing material can pass between them. Since the scoops 26 are rotating, some of the discharged material may be picked up by the scoops, but even so, it is simply carried around the drum 14 and discharged into the hopper 12 at the completion of the revolution. Consequently the drum can be easily and fully discharged, even though the scoops continue to revolve.

In cleaning up the material on the floor at the base of the pile, the operator lifts on the handle 22, tilting the forward end or nose of the cart down. This lowers the series of scoops, whose center of rotation is eccentric to the axis of the cart wheels 10, so that the scoops can be brought down until they scrape along the floor or ground, cleaning up the last remnants of the material being handled.

I claim:

1. A rotary scoop type machine for handling loose bulk material comprising, in combination, a wheeled cart having a horizontal trunnion shaft thereon, a container fixed to said shaft for oscillation therewith and disposed with the shaft projecting through it, a plurality of scoops, a support freely journaled on said shaft and carrying said scoops in an endless circular series encircling said container, power actuating means carried by said cart, means including a sprocket wheel loosely journaled on one end portion of said shaft and fixed to said revoluble support and having an endless chain trained thereover for connecting said power actuating means in driving relation with said support to revolve the latter, said scoops being positioned on said support to dump their contents onto the container as they successively pass over its top, said container having a peripheral opening therein, and means for turning said shaft to shift said container between a filling position in which said opening is located on the upper side of the container and a discharge position in which said opening is on the lower side of the container, said turning means comprising a hand lever and a second sprocket wheel fixed to the end portion of said shaft opposite to the one first mentioned and a second endless chain trained thereover for connecting said hand lever to said second sprocket wheel to turn the shaft.

2. In a machine of the type described, the combination with a batch container having an opening therein and shiftable from a position in which said opening is located near the top of the container, for receiving material dumped therethrough into the container, to a position in which said opening is lowered, for gravity discharge through it of the container contents; of means for feeding material to said container opening when the latter is in its first mentioned position, power actuated means for driving said feed means substantially continuously, and selectively operable means for shifting said container between the positions set forth independently of the operation of said power actuated means.

3. In a machine of the type set forth, the combination of a rotary scoop assembly comprising a pair of substantially imperforate disk shaped end plates rotatably mounted in coaxial spaced relation and a plurality of scoops mounted in a circular series between said end plates, a container nested within said assembly and having an opening therein positioned to receive the contents of successive scoops passing over it as said scoop assembly is revolved, a stationary dust guard substantially covering the top and rear side of the periphery of said rotary scoop assembly, and said dust guard having an observation port therein located to register with said scoops at a point after they have passed over said opening in the container.

4. A machine of the type set forth comprising, in combination, a two-wheeled cart, a batch container mounted on said cart and having a filling opening therein, a rotary scoop assembly comprising a circularly disposed series of scoops and a revoluble support therefor, said series of scoops being disposed to encircle said container peripherally and pass successively over said filling opening during the rotation of said revoluble support, means on the cart journaling said support for rotation about a horizontal axis adjacent to but slightly forward of the parallel axis of the cart wheels, whereby the cart may be tilted forwardly about the axis of its wheels to lower said scoop assembly relative to the ground, means on said cart for revolving said rotary scoop assembly, and a caster wheel arranged to support the rear portion of said cart.

5. A machine of the type set forth comprising, in combination, a two-wheeled cart, a rotary scoop assembly comprising a circularly disposed series of scoops and a revoluble support therefor, means on the cart journaling said support for rotation about a horizontal axis eccentric with respect to the parallel axis of the cart wheels, whereby the cart may be tilted about the axis of its wheels to raise or lower said scoop assembly relative to the ground, and means on said cart for revolving said rotary scoop assembly.

6. In a machine of the character set forth, the combination of a generally cylindrical container drum disposed with its longitudinal axis horizontal and having a peripheral opening in its upper side, a plurality of scoops, means supporting said scoops in an endless series encircling the drum peripherally for revolving movement about the latter to dump their contents successively into said opening as they pass over it, and a plurality of vertically disposed baffle plates extending longitudinally of the drum across said opening, said plates being spaced laterally from each other and disposed with the lower edge of each plate well below the upper edge of the next adjacent plate progressing in a direction downward about the periphery of said drum at the opening.

7. In a machine of the type described, the combination of a generally cylindrical container drum disposed with its longitudinal axis horizontal, a rotary scoop assembly comprising a circular series of scoops arranged to encircle the periphery of the drum and revolve about the latter, said drum having a peripheral opening in its upper side forming an entryway for material dumped into it from successive scoops passing over the same, and baffle means at said opening for preventing overrunning of material from said opening until the drum is completely full.

8. A machine of the type described comprising, in combination, a wheeled cart, two coaxial drums nested one inside the other, the inner drum constituting a batch container and having a peripheral opening therein, the outer drum comprising a circular series of scoops encircling the periphery of the inner drum and positioned to discharge their contents successively through said opening into the inner drum as they pass over the same, means supporting said drums on said cart for independent rotary movement about their coincident axes, power actuated means mounted on said cart for substantially continuously revolving said outer drum, and manually operable means for swinging said inner drum into either a filling position in which its opening faces upward for the reception of material from said scoops or in a discharge position in which said opening faces downward for gravity discharge of the contents of the inner drum.

CHARLES S. JOHNSON.